(12) United States Patent
Kruse et al.

(10) Patent No.: US 7,872,975 B2
(45) Date of Patent: Jan. 18, 2011

(54) FILE SERVER PIPELINING WITH DENIAL OF SERVICE MITIGATION

(75) Inventors: David Kruse, Kirkland, WA (US); Ramanathan Ganapathy, Redmond, WA (US); Jeffrey C. Fuller, Redmond, WA (US); Mathew George, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 11/690,962

(22) Filed: Mar. 26, 2007

(65) Prior Publication Data
US 2008/0240144 A1 Oct. 2, 2008

(51) Int. Cl.
*H04L 12/56* (2006.01)
(52) U.S. Cl. .................... 370/235.1; 370/230; 370/232; 370/449
(58) Field of Classification Search .................. None
See application file for complete search history.

(56) References Cited

U.S. PATENT DOCUMENTS

| | | | | | |
|---|---|---|---|---|---|
| 5,943,316 | A | * | 8/1999 | Davis | 370/232 |
| 6,862,295 | B1 | * | 3/2005 | Stacey et al. | 370/466 |
| 7,227,840 | B1 | * | 6/2007 | Ferguson et al. | 370/230 |
| 2003/0099199 | A1 | * | 5/2003 | Kiremidjian et al. | 370/230.1 |
| 2003/0185155 | A1 | | 10/2003 | Huang et al. | |
| 2003/0210672 | A1 | * | 11/2003 | Cromer et al. | 370/338 |
| 2003/0229720 | A1 | * | 12/2003 | Kiremidjian et al. | 709/253 |
| 2004/0236888 | A1 | * | 11/2004 | Dieffenderfer et al. | 710/112 |
| 2005/0163059 | A1 | * | 7/2005 | Dacosta et al. | 370/252 |
| 2005/0254519 | A1 | * | 11/2005 | Beukema et al. | 370/468 |
| 2007/0109961 | A1 | * | 5/2007 | Liang | 370/229 |

FOREIGN PATENT DOCUMENTS

| KR | 20010055926 A | 7/2001 |
|---|---|---|
| WO | WO-03096626 A1 | 11/2003 |

OTHER PUBLICATIONS

Written Opinion for PCT/US2008/005396 mailed Jul. 31, 2008.
International Search Report for PCT/US2008/005396 mailed Jul. 31, 2008.

* cited by examiner

*Primary Examiner*—Ricky Ngo
*Assistant Examiner*—Rasheed Gidado
(74) *Attorney, Agent, or Firm*—Marshall, Gerstein & Borun LLP

(57) ABSTRACT

A method of metering bandwidth allocation on a server using credits is disclosed. The method may receive a request for data from a client, respond to the request for data and determining if the request for data for the client exceeds a current data allocation credit limit for the client. Using the round trip time, the method may calculate a connection throughput for a client and may increase the current data allocation credit limit for the client if the server has resources to spare, the client is actively using the current pipeline depth allowed and network connection latency and bandwidth indicate a deeper pipeline is necessary for saturation. The method may decrease the current data allocation credit limit for the client if the server does not have resources to spare.

18 Claims, 3 Drawing Sheets

FILE SERVER PIPELINING WITH DENIAL OF SERVICE MITIGATION

BACKGROUND

This Background is intended to provide the basic context of this patent application and it is not intended to describe a specific problem to be solved.

A file client may post a number of outstanding requests to a file server, and each of these posted requests will use file server resources until the request is processed and a response is sent. Without limiting the number of outstanding file operation requests sent by a client, a file server exposes itself to simple denial of service (DoS) attacks. The easiest way to prevent a client connection from locking down excessive server resources is to enforce a small, static limit on the number of outstanding operations. This method, however, limits performance as a deep pipeline of operations is necessary to fully utilize bandwidth, especially with high latency connections.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of metering bandwidth allocation on a server using credits is disclosed. The method may receive a request for data from a client, respond to the request for data and determining if the request for data for the client exceeds a current data allocation credit limit for the client. Using the round trip time, the method may calculate a connection throughput for a client and may increase the current data allocation credit limit for the client if the server has resources to spare, the client is actively using the current pipeline depth allowed and network connection latency and bandwidth indicate a deeper pipeline is necessary for saturation. The method may decrease the current data allocation credit limit for the client if the server does not have resources to spare.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
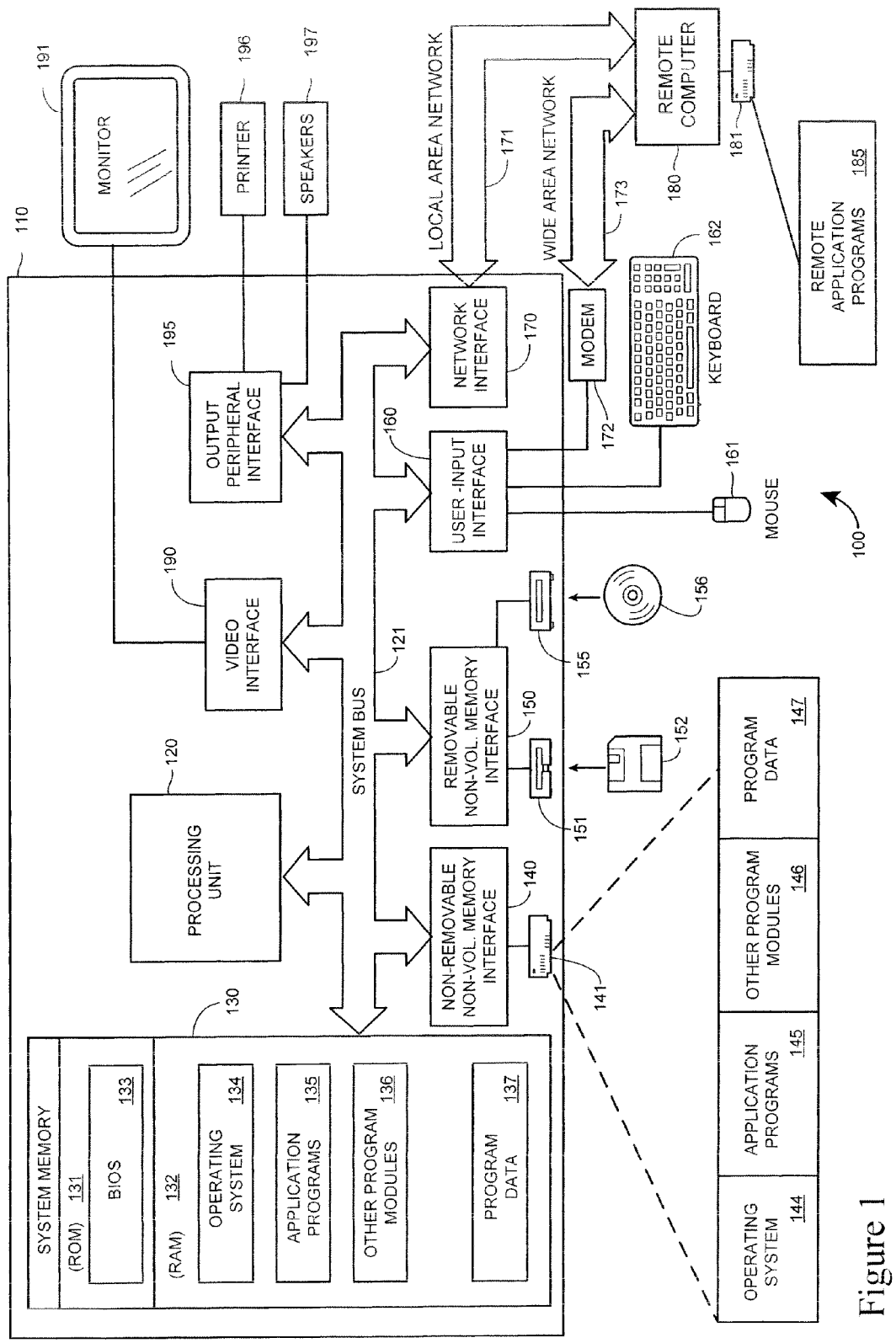
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
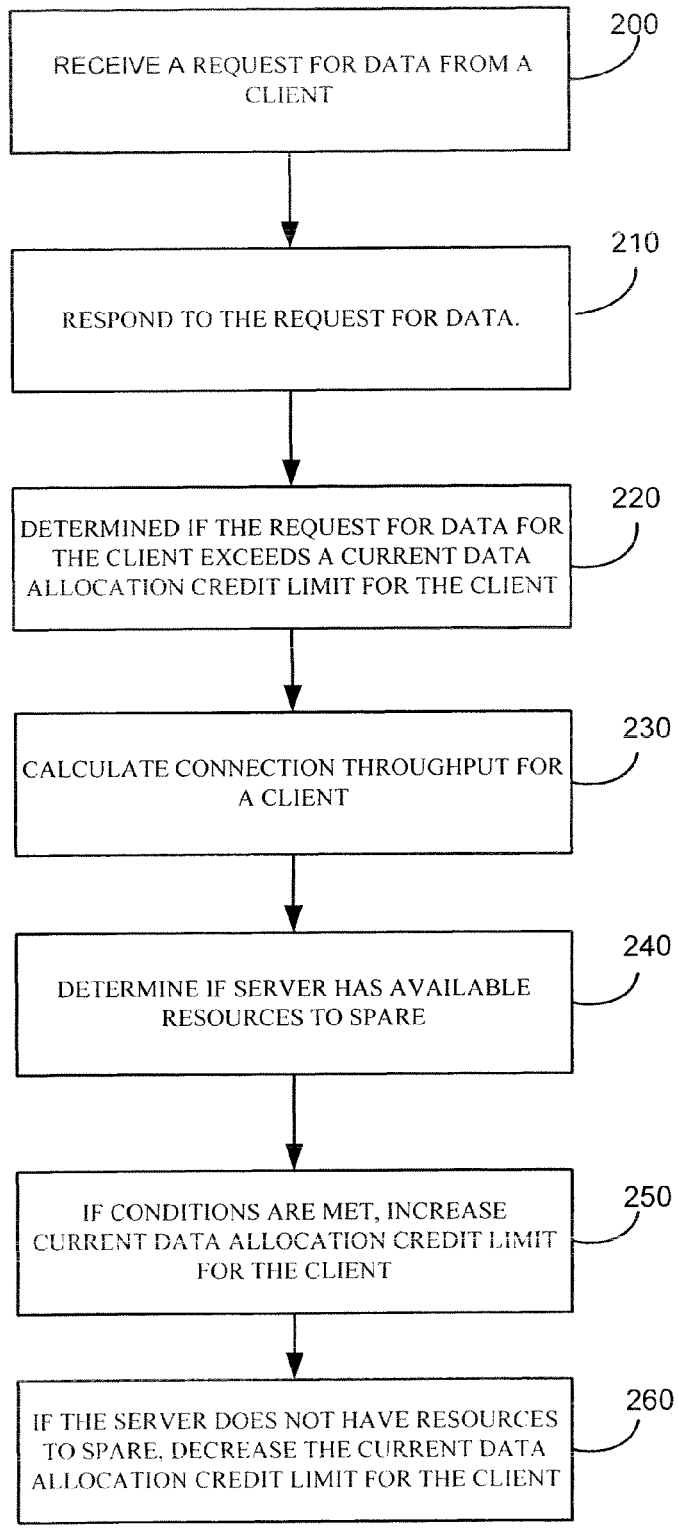
FIG. 2 is flowchart of a method of metering bandwidth allocation on a server using credits.
Figure 3:
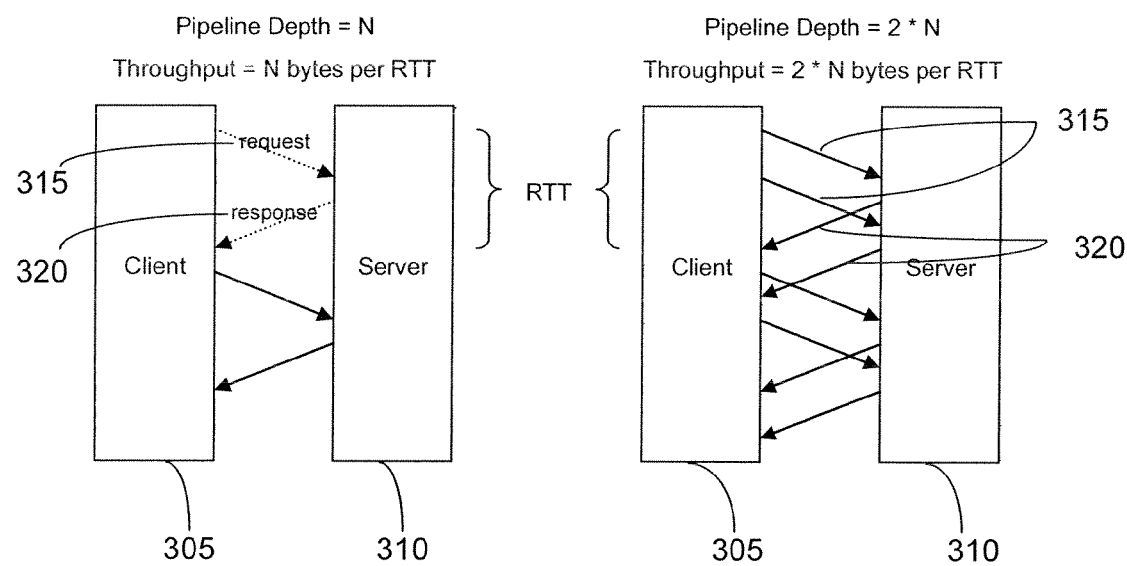
FIG. 3. is an illustration of the advantage of metering bandwidth.

FIG. 2 illustrates a method of metering bandwidth allocation on a computer 100 such as a server using credits. Servers have a limited ability to respond to requests. As a result of this limitation, problems may arise. For example, a nefarious user may launch a denial of service attack by making requests from the server that exceed the capability of the server. In another example, a user may be able to monopolize a server if steps are not taken to share the capabilities of the serve among the many users. FIG. 3 may illustrate a sample client 305 and server 310. The client 305 communicates a request 315 and the server 310 communicates a response 320.

The following method and alternatives thereof addresses this problem by taking into account specific server 310 resources, connection variables and client activity patterns to give clients an appropriately deep pipeline. Specifically, the allowed client pipeline depth is increased only when: 1) the server 310 has resources to spare; and 2) the client is actively using the current pipeline depth allowed; and 3) the network connection latency and bandwidth indicate a deeper pipeline is necessary for saturation. As a result, file server 310 operations may be dynamically throttled by using server 310 resource information, network connection information, and client activity patterns to determine throttling. More specifically, the method may dynamically determine the credit limit for each client given server 310, connection, and client information in a way that reduces denial of service opportunities while maximizing pipeline depth and performance when needed.

At block 200, a request for data may be received from a client. The request may be received at a computer such as a server 310. At block 210, the receiver of the request may respond to the request for data. For example, the server 310 may communicate data related to the request in block 200. If the server 310 is busy, it may send a message that it is busy. Other responses are possible.

At block 220, it is determined if the request for data for the client exceeds a current data allocation credit limit for the client. File server resources can be measured in terms of "credits", which represent an outstanding work item that has not yet been completed. Each credit may represent a maximum amount of request data (64 kB, for example) from the client as well as server-specific resources to track the processing of the request. The Server Message Block ("SMB") 2.0 file-sharing protocol provides a mechanism for crediting.

A file server 310 can control the number of outstanding requests from a client by allowing each client to use a specific maximum number of credits. Any requests beyond this limit will fail and may end the client's connection to the server 310. Typically, this maximum pipeline depth is a small, static value, that not only limits denial of service opportunities but also concurrency and performance.

A deeper pipeline may be necessary to fully utilize bandwidth as the bandwidth-delay product of a network connection increases. For example, if a connection has a round trip time (RTT) of 10 ms and a bandwidth of 125 Mbytes/sec, the application protocol must transfer an average 1.25 Mbytes per round trip in order to fully utilize the bandwidth available. If the application protocol's pipeline depth is less than this value, it will not be able to transfer enough data per round trip to make use of its bandwidth. FIG. 3 may illustrate the benefits of a deeper pipeline.

Each client may start with a default value for its data allocation credit limit. By adjusting the credit limit, the server 310 may be able to ensure that bandwidth allocation is maximized while ensuring that denial of service attacks are not successful. Ideally, the default value may be sufficient to saturate a typical bandwidth-delay product. For example, a 1 Gbps link with a 10 ms round trip time (RTT) requires 1.25 Mbytes of outstanding data, which equals about twenty 64 kB credits. In one embodiment, the client may be informed about its current credit limit.

At block 230, a connection throughput may be calculated for a client. In general, throughput may be calculated as the number of data packets (or bits contained in data packets) correctly received at the destination divided by the duration it took for the data packets to be received. In one embodiment, the connection's throughput may be computed each time a full credit window is expended. For example, if a client has 10 credits and the time between the first and 11'th SMB requests is 100 milliseconds, where each credit may represent up to 64 kB of data, then the connection throughput is computed as 640 kB in 0.1 seconds, or 6.4 Mbytes/sec. This throughput can have a floor value to prevent a malicious client from obtaining credits by simulating a very low initial throughput. The floor value should be low enough to satisfy the worst supported round trip time ("RTT"). For example, if the method is adapted to 2-second RTT connections, and the default credit limit is twenty 64 kB credits, then the enforced floor throughput should be no higher than 1.28 Mbytes per 2 seconds, or 640 kB/sec. Otherwise, such connections will not be able to demonstrate higher computed throughput given more credits since the floor value would be higher than their true maximum throughput. Also, a floor throughput naturally prevents small control server message blocks from contributing unnecessarily to a deeper pipeline.

At block 240, it may be determined whether the server has addition available resources to spare. In one embodiment, having resources available or to spare may mean having sufficient memory to track requests and hold incoming data. In another embodiment, having resources available may mean having specifically allocated data structures necessary to track requests and hold incoming data.

At block 250, the current data allocation credit limit for the client may be increased if the server has resources to spare and the client is actively using the current pipeline depth allowed and network connection latency and bandwidth indicate a deeper pipeline is necessary for saturation. Determining if a client is actively using the current pipeline depth allowed may mean that the connection's throughput has increased by a given percentage (such as 50%) of the expected amount given the last credit increase. For example, if the connection's limit was last increased from 20 to 40 and the throughput at that time was 100 kB/sec, the connection must achieve at least 150 kB/sec in order to qualify for another increase.

At block 260, the current data allocation credit limit for the client may be decreased if the server 310 does not have resources to spare. As stated in relation to block 240, resource may refer to memory and specifically allocated data structures necessary to track requests and hold incoming data.

In operation, the current data allocation credit limit for the client may be decreased from connections with the largest number of credits. In another embodiment, the credits may be reduced proportionately among all the clients. There may also be a credit floor which clients may stay above. In addition, when decreasing the current data allocation credit limit for the client, the client may be informed that its credits have been reduced further, either asynchronously or in the next SMB response. In addition, incoming requests may be throttled at the transport level to comply with the current credit limit.

If a pipeline is full (of the previous depth), incoming requests that exceed the new credit limit may be failed. This allows any requests outstanding on the network at the time of the credit change to be gracefully processed.

In another embodiment, the data requests that are currently being processed for the affected connection may be completed as soon as possible to reduce the connection's resource usage. For example, pending change notification requests may be triggered immediately to release their server resources. In addition, connection resources in excess of the new credit limit may be freed as they become available.

The effect of this algorithm may be the following:

All connections may pipeline enough data to saturate typical bandwidth-delay-product connections;

Connections that appear to gain a real benefit from a higher credit limit will receive it. This allows high latency and/or high bandwidth connections to eventually saturate their network capacity; and A malicious client cannot obtain server 310 resources trivially, and cannot lock them down permanently. The client can get additional server 310 resources by performing a bulk of work in the same way as a legitimate client—the server cannot distinguish between these two cases that are doing real work. In the worst case, a malicious client can gradually obtain server resources by constantly performing work over a simulated high latency connection. Such a client will not get additional resources if the server 310 determines resources are low or other clients need the existing resources more. The client will also lose its extra resources and be throttled if the server 310 wants to reclaim them.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of metering packet network bandwidth allocation using credits on a computer server in communication over an intranet or Internet packet network with a client hosted on a computer separate from the server, the method comprising:
  receiving a request for data at the server from the client computer separate from the server over an intranet or Internet packet network;
  responding to the request for data;
  determining if the request for data for the client exceeds a current data allocation credit limit for the client;
  calculating a connection throughput for the client as the data correctly received via the packet network at the client divided by the time for the data to be received;
  increasing the current data allocation credit limit for the client if:
    the server has resources to spare; and
    the client is actively using a current pipeline depth allowed; and
    network connection latency and bandwidth indicate a deeper pipeline is necessary for saturation; and
  decreasing the current data allocation credit limit for the client if:
    the server determines insufficient specifically allocated data structures necessary to track requests and hold incoming data; and
    informing the client about its credit limit.

2. The method of claim 1, wherein the client is actively using the current pipeline depth allowed further comprises that the connection's throughput has increased by at least a given percentage of the expected amount given the last credit increase.

3. The method of claim 2, wherein the given percentage is fifty percent.

4. The method of claim 1, wherein having resource available further comprises having allocated data structures necessary to track requests and hold incoming data.

5. The method of claim 1, wherein decreasing the current data allocation credit limit for the client further comprises taking credits away from connections with the largest number of credits.

6. The method of claim 1, wherein increasing the current data allocation credit limit for the client comprises increasing the current data allocation limit in blocks of 64 kilobytes of request data.

7. The method of claim 5, further comprising throttling incoming requests at a transport level to comply with the current credit limit.

8. The method of claim 7, further comprising if a full pipeline of a previous depth has been processed, begin failing incoming requests that exceed the new credit limit.

9. The method of claim 5, further comprising completing the data requests that are currently being processed for the affected connection as soon as possible to reduce the connection's resource usage.

10. The method of claim 9, further comprising if there is a pending change notification request for a client, immediately releasing server resources being held for that client.

11. The method of claim 5, further comprising freeing connection resources in excess of the new credit limit as they become available.

12. A computer readable volatile or non-volatile, removable or non-removable RAM, ROM, EEPROM, flash memory, optical disk storage including CD-ROM and digital versatile disk (DVD), magnetic cassettes, magnetic tape, or magnetic disk storage for storing computer executable instructions, comprising computer executable instructions for metering bandwidth allocation with a client using credits on a server in communication with the client over a packet network, the instruction comprising computer executable instructions for:
  determining if a request for data for the client exceeds a current data allocation credit limit for the client;
  calculating a connection throughput for the client as the data correctly received at the client divided by the time for the data to be received;
  increasing the current data allocation credit limit for the client if:
    the server has resources to spare; and
    the client is actively using a current pipeline depth allowed; and
    network connection latency and bandwidth indicate a deeper pipeline is necessary for saturation; and
  decreasing the current data allocation credit limit for the client if:
    the server determines one of insufficient specifically allocated data structures necessary to track requests and hold incoming data and informing the client about its credit limit.

13. The computer readable volatile or non-volatile, removable or non-removable RAM, ROM, EEPROM, flash memory, optical disk storage including CD-ROM and digital versatile disk (DVD), magnetic cassettes, magnetic tape, or magnetic disk storage of claim 12, wherein the client is actively using the current pipeline depth allowed further comprises that the connection's throughput has increased by at least fifty percent of the expected amount given the last credit increase.

14. The computer readable volatile or non-volatile, removable or non-removable RAM, ROM, EEPROM, flash memory, optical disk storage including CD-ROM and digital versatile disk (DVD), magnetic cassettes, magnetic tape, or magnetic disk storage of claim 12, wherein decreasing the current data allocation credit limit for the client further comprises taking credits away from connections with the largest number of credits.

15. The computer readable volatile or non-volatile, removable or non-removable RAM, ROM, EEPROM, flash memory, optical disk storage including CD-ROM and digital versatile disk (DVD), magnetic cassettes, magnetic tape, or magnetic disk storage of claim 12, further comprising computer executable instructions for throttling incoming requests at a transport level to comply with the current credit limit and if a full pipeline of a previous depth has been processed, begin failing incoming requests that exceed the new credit limit.

16. The computer readable volatile or non-volatile, removable or non-removable RAM, ROM, EEPROM, flash memory, optical disk storage including CD-ROM and digital versatile disk (DVD), magnetic cassettes, magnetic tape, or magnetic disk storage of claim 12, further comprising if there is a pending change notification request for a client, computer executable instructions for immediately releasing server resources being held for that client.

17. A computer system comprising a processor configured according to executable computer executable instructions, a memory for storing the computer executable instructions and an input-output device, the computer executable instructions comprising instructions for:
   determining if a request for data for a client exceeds a current data allocation credit limit for the client;
   determining if a request for data for a client exceeds a current data allocation credit limit for the client;
   calculating a connection throughput for a client;
   increasing a current data allocation credit limit for the client if:
      the server has resources to spare wherein having resources available further comprises sufficient memory and data structures to track requests and hold incoming data; and
      the client is actively using the current pipeline depth allowed wherein the client is actively using the current pipeline depth allowed further comprises that the connection's throughput has increased by at least fifty percent of the expected amount given the last credit increase; and
      network connection latency and bandwidth indicate a deeper pipeline is necessary for saturation; and
   decreasing the current data allocation credit limit for the client if:
      the server does not have resources to spare.

18. The computer system of claim 17, further comprising computer executable instructions for throttling incoming requests at the transport level to comply with the current credit limit and if a full pipeline of a previous depth has been processed, begin failing incoming requests that exceed the new credit limit.

* * * * *